United States Patent [19]
Weiss

[11] Patent Number: 5,367,572
[45] Date of Patent: Nov. 22, 1994

[54] METHOD AND APPARATUS FOR PERSONAL IDENTIFICATION

[76] Inventor: Kenneth P. Weiss, 7 Park Ave., Newton, Mass. 02158

[21] Appl. No.: 923,085

[22] Filed: Jul. 31, 1992

Related U.S. Application Data

[63] Continuation of Ser. No. 670,705, Mar. 18, 1991, Pat. No. 5,168,520, which is a continuation-in-part of Ser. No. 341,932, Apr. 21, 1989, Pat. No. 5,023,908, which is a continuation-in-part of Ser. No. 802,579, Nov. 27, 1985, Pat. No. 4,885,778, which is a continuation-in-part of Ser. No. 676,626, Nov. 30, 1984, Pat. No. 4,720,860.

[51] Int. Cl.$^5$ ............................................. H04L 9/32
[52] U.S. Cl. ........................................ 380/23; 380/24; 380/25; 380/49; 340/825.31; 340/825.34; 235/379; 235/380; 235/382
[58] Field of Search ............ 235/379, 380, 382; 380/23-25, 4, 30, 49, 50, 3; 340/825.31, 825.34

[56] References Cited

U.S. PATENT DOCUMENTS

| | | | |
|---|---|---|---|
| 3,764,742 | 10/1973 | Abbott et al. | 380/23 |
| 3,806,874 | 4/1974 | Ehrat | 380/23 |
| 3,886,451 | 5/1975 | Chu et al. | 368/118 |
| 3,900,867 | 8/1975 | Wagner | 342/45 |
| 3,995,111 | 11/1976 | Tsuji et al. | 375/109 |
| 4,104,694 | 8/1978 | Hargrove | 361/172 |
| 4,126,761 | 11/1978 | Graope et al. | 380/28 |
| 4,145,568 | 3/1979 | Ehrat | 380/47 |
| 4,145,569 | 3/1979 | Ehrat | 380/48 |
| 4,185,166 | 1/1980 | Kinch, Jr. et al. | 380/43 |
| 4,193,073 | 3/1980 | Kohnen | 342/56 |
| 4,277,837 | 7/1981 | Stuckert | 235/380 |
| 4,295,039 | 10/1981 | Stuckert | 235/380 |
| 4,302,810 | 11/1981 | Bouricius et al. | 380/24 |
| 4,320,387 | 3/1982 | Powell | 340/825.34 |
| 4,326,098 | 4/1982 | Bouricius et al. | 380/25 |
| 4,453,657 | 6/1984 | Kuehn | 225/65 |
| 4,471,216 | 9/1984 | Herve | 235/380 |
| 4,494,211 | 1/1985 | Schwartz | 375/107 |
| 4,536,647 | 8/1985 | Atalla et al. | 380/24 |
| 4,543,657 | 9/1985 | Wilkinson | 375/1 |
| 4,578,530 | 3/1986 | Zeidler | 380/24 |
| 4,582,434 | 4/1986 | Plangger et al. | 368/46 |
| 4,589,066 | 5/1986 | Lam et al. | 395/550 |
| 4,599,489 | 7/1986 | Cargile | 380/4 |
| 4,609,777 | 9/1986 | Cargile | 380/4 |
| 4,636,583 | 1/1987 | Bidell et al. | 380/48 |
| 4,641,322 | 2/1987 | Hasegawa | 375/1 |
| 4,677,617 | 6/1987 | O'Connor et al. | 370/50 |
| 4,849,613 | 7/1989 | Eisele | 235/379 |

OTHER PUBLICATIONS

Sytek Product Literature, no date.
Racal Guardata Product Literature, Bulletin RG500, Apr. 1989.
I.B.M. Tech. Discl. Bull., (vol. 26; No. 7A, Dec. 1983, pp. 3293-3293).
I.B.M. Tech. Discl. Bull., (vol. 28; No. 7A, Dec. 1983, pp. 3286-3288).

Primary Examiner—Bernarr E. Gregory

[57] ABSTRACT

A method and apparatus for providing improved security for a personal identification number (PIN) in a personal identification and verification system of the type wherein a time dependent nonpredictable code is generated at a device in the possession of the individual, which code is unique to the individual and this code is communicated to, and compared with a nonpredictable code generated at a central verification computer. In this system, the PIN is mixed with the nonpredictable code before transmission of these values to the central verification computer. A nonsecret code is previously transmitted to the central verification computer and is used to retrieve the PIN and the appropriate nonpredictable code for the user. These values are used to strip the PIN from the transmitted nonpredictable code and the stripped PIN and remaining nonpredictable code are compared with the corresponding retrieved values in order to determine verification.

5 Claims, 2 Drawing Sheets

METHOD AND APPARATUS FOR PERSONAL IDENTIFICATION

CROSS REFERENCE TO OTHER APPLICATIONS

This application is a continuation of application Ser. No. 07/670,705 filed on Mar. 18, 1991, now U.S. Pat. No. 5,168,520, the contents of which are expressly incorporated by reference, which is a continuation-in-part of application Ser. No. 07/341,932 filed Apr. 21, 1989, which is a continuation-in-part of application Ser. No. 802,579 filed Nov. 27, 1985, issued Dec. 5, 1989 as U.S. Pat. No. 4,885,778, which application is itself a continuation-in-part of application Ser. No. 676,626 filed Nov. 30, 1984, now U.S. Pat. No. 4,720,860, issued Jan. 19, 1988. The disclosures and specifications of all of the foregoing applications/patents are incorporated herein by reference as if fully set forth.

FIELD OF THE INVENTION

This invention relates to methods and apparatus for identifying an individual and more particularly to methods and apparatus for providing improved security for a personal identification number (PIN) utilized in conjunction with such an identification system.

BACKGROUND OF THE INVENTION

Personal identification systems may be based on something someone has, such as a card or badge, something that someone knows, such as a PIN, or some characteristic of the individual, such as his fingerprints or speech pattern. Security for such systems is enhanced by utilizing two or more of the above in performing the identification.

For example, parent Pat. No. 4,720,860, discloses a personal identification system wherein the individual has a card or other small, portable device which contains a microprocessor programmed to utilize a secret algorithm to generate a nonpredictable number from a stored value unique to the individual and a time varying value provided for example by a clock. The nonpredictable value is preferably displayed on the device. The individual then enters his secret PIN into a central verification system, either directly or over a telephone line, causing the central system to access stored information corresponding to the individual and to utilize at least some of this information to generate a nonpredictable value at the central computer utilizing the same algorithm as at the individual's microprocessor. At the same time this is being done, the individual is entering the number appearing at that period of time on the display of his device. The two values will match, signifying identification of the individual, only if the individual has entered the correct PIN and if the individual has the proper device so that the nonpredictable code displayed corresponds to that being generated at the central verification computer.

In other systems, such as those shown in U.S. Pat. No. 4,599,489 issued Jul. 8, 1986, the PIN may either be stored in the user's device, or may be entered by the user. If the PIN is stored in the device, it is read from the device by a suitable reader and causes the central verification computer to generate a unique challenge code to the individual. This challenge code may either be entered by the individual into his machine, or may be automatically sensed by the machine, and is operated on by the user's device to generate a unique nonpredictable code which is then entered into the central computer to effect verification.

One potential difficulty with either of the systems indicated above is that an unauthorized individual may be able to obtain access to the user's PIN by electronic eavesdropping, reducing the security provided by the system. If, for example, the PIN is transmitted over public lines, such as telephone lines, from the user to the central verification computer, it may be possible to tap these lines and intercept the PIN as it is being transmitted. If the PIN is stored in the device, someone obtaining the device surreptitiously may, through sophisticated means, be able to determine the PIN stored in the device and thus defeat the security of the system. Furthermore, any storing of a PIN or password in the portable device for comparison defeats the purpose of an independent identification factor and reduces security to a "thing" possessed.

A need therefore exists for an improved means of communicating a PIN or other user identification code to a central verification system such that someone tapping the line over which the code is being sent will be unable to determine the secret identification number and someone obtaining possession of the user device will also not be able to obtain access to the user's secret identification number from the device.

SUMMARY OF THE INVENTION

In accordance with the above, this invention provides a method for personal identification and apparatus for the practice thereof wherein a device in the possession of the individual is utilized to generate a unique, time varying, nonpredictable code; the nonpredictable code generated at a given time is mixed with a secret PIN for the individual; the mixed output is communicated to a central verification computer; and the verification computer typically strips the PIN from the communicated value and utilizes the stripped PIN and remaining nonpredictable code to perform a verification operation. Alternatively and equivalently, the mixed output which is communicated to the verification computer may be verified in the verification computer without stripping of the PIN. Preferably, before the mixed value is communicated to the verification computer, a nonsecret identifying code for the individual is communicated to the verification computer; the verification computer utilizes the nonsecret identifying code to obtain the PIN and appropriate nonpredictable code for the individual; and the verification operation includes the PIN and appropriate nonpredictable code obtained during the obtaining step being compared with the stripped PIN and remaining nonpredictable code. Alternatively the PIN may not be stripped from the mixed value, the verification computer may utilize the nonsecret identifying code to retrieve or obtain the PIN and appropriate nonpredictable code, combine the retrieved PIN and appropriate nonpredictable code, and perform a verification operation between the mixed value communicated to the verification computer and the combination of the retrieved PIN and appropriate nonpredictable code. The verification computer may also generate a unique challenge value in response to the nonsecret identifying code which challenge code is communicated to the device in possession of the individual. For one embodiment, the challenge code is communicated to the individual and the individual inputs the challenge value and the PIN to his device, the device includes means responsive to the challenge value for generating the nonpredictable code. During the mixing step, the device may receive the PIN and the nonpredictable code and generate an output which is a predetermined function of the inputs. The predetermined function may, for example, be a sum of the inputs, for example the sum of the inputs without carry.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
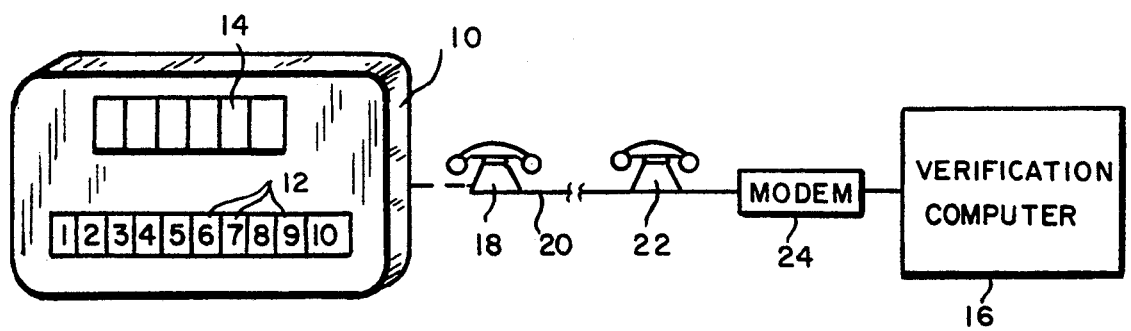
FIG. 1 is a semi-block schematic diagram of the verification system of a first embodiment of the invention.

FIG. 1 shows illustrative structure for a personal identification system of a first embodiment of the invention. In this figure, a user verification device 10 is provided which is of the type described in the parent applications. The device is preferably of the general size and shape of a standard credit card, although its thickness dimension may be slightly greater than that of such cards. The device 10 has a clock which generates a time-dependent digital output to a microprocessor which is programmed with a unique algorithm to operate on the time-dependent clock input and on a stored static value unique to a given user to generate a multibit nonpredictable code. A plurality of input areas 12 are provided on the face of device 10. These areas are preferably each indicative of a numerical digit, for example the digits 1-0 as shown in FIG. 1, and may be pressure-sensitive pads or otherwise adapted to generate an electrical output indicative of the area when the area is touched by the user. Spacing may be provided between the individual areas 12 to assure distinctive outputs. As will be described in greater detail hereinafter, the user may input his unique PIN on areas 12 which are mixed in the processor in device 10 with the nonpredictable code generated therein in response to the time-dependent and static inputs to generate a multibit nonpredictable code which is displayed on area 14 of device 10. Area 14 may be a liquid crystal display or other suitable display device for producing numeric or alpha-numeric characters. Each area of display 14 is adapted to display a different digit of the nonpredictable code.

Figure 3:
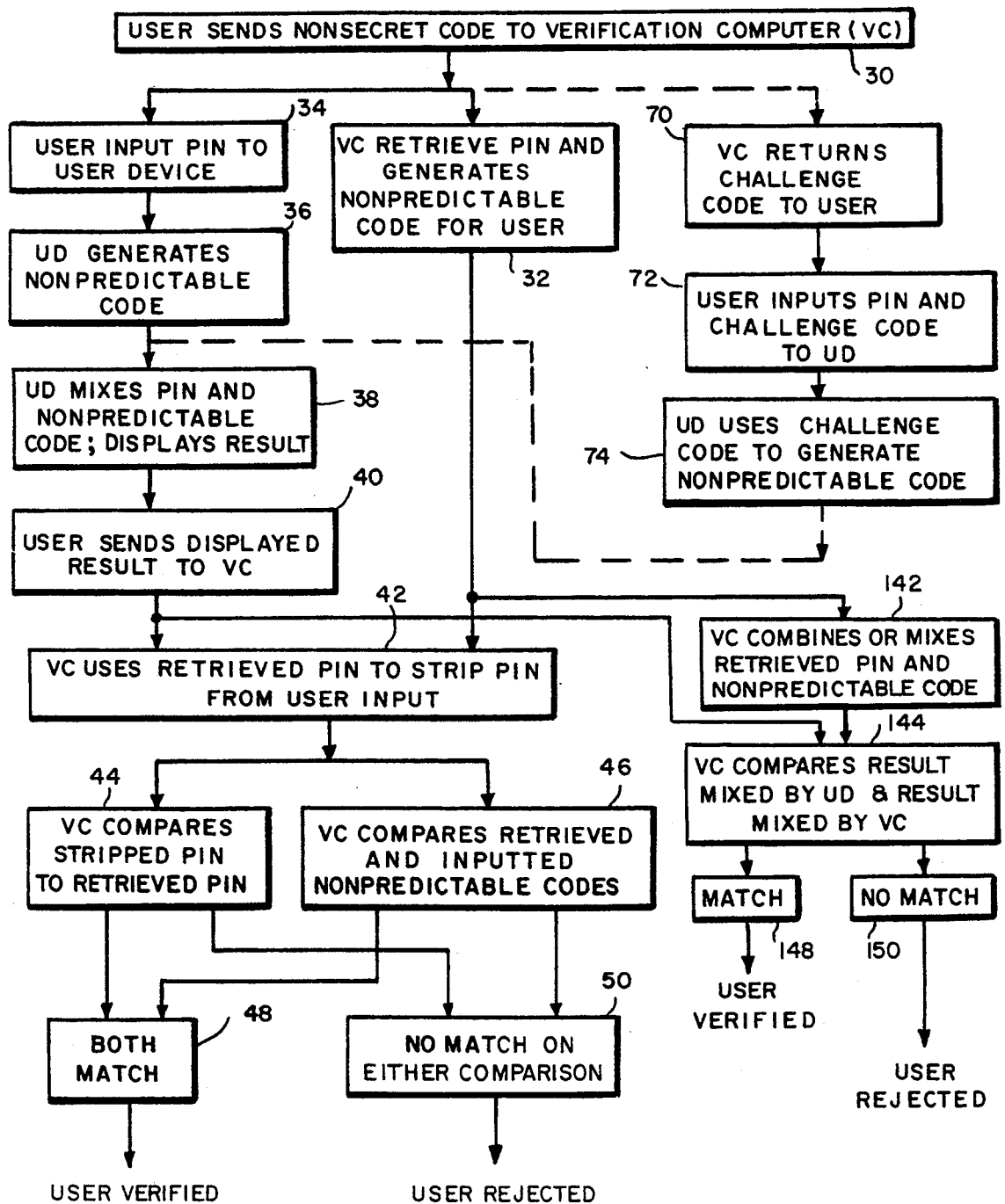
FIG. 3 is a block flow diagram illustrating the operation of the first embodiment of the invention and alternative steps for the second embodiment of the invention.

The user initially transmits a nonsecret identifying code to verification computer 16 by keying this number into a telephone 18 at his location. This number is transmitted over telephone lines 20 to telephone 22 at the verification station and through a modem 24 at this station to the verification computer. The user may then use the telephone 18 to key in and transmit the nonpredictable code being displayed at that time on display FIG. 3 is a flow diagram illustrating in greater detail the operation of the system of FIG. 1 to perform a verification operation. Referring to FIG. 3, the first step in the operation, step 30, is for the user to send his nonsecret code to verification computer (VC) 16. As previously indicated, this is accomplished by the user keying his nonsecret identification number into telephone 18 for transmission through telephone line 20, telephone 22 and modem 24 to the verification computer.

In response to the user input of his nonsecret code, the verification computer retrieves the user's PIN and generates the nonpredictable code for the user, using the same algorithm and stored static value as user device 10, and using a time-related value from a clock device at the verification computer, which is maintained in synchronism with the clock at the user device in a manner discussed in the parent application (step 32). At the same time that the verification computer is retrieving the PIN and nonpredictable code for the user, the user is inputting his PIN into his device 10 using key pads or areas 12 (step 34). While the user is inputting his pin, the user device is continuously generating nonpredictable code values at its internal processor in response to the clock value and the stored static value using the unique algorithm at the user device processor (step 36).

The next step in the operation, step 38, is for the generated nonpredictable code and the inputted pin to be mixed by the processor in device 10 to generate a new nonpredictable code which is displayed on display 14. The mixing operation may be a simple addition of the two values without carry, or with carry, (a constant added to a pseudo random number produces a pseudo random number) or may involve a more sophisticated mixing algorithm.

During step 40, the user transmits the displayed value by use of telephone 18 through telephone line 20, telephone 22, and modem 24 to verification computer 16.

During the next step in the operation, step 42, the verification computer uses the PIN for the user which was retrieved during step 32 to strip the PIN from the inputted nonpredictable code, the result being a PIN value and a nonpredictable code value. During step 44 the stripped PIN is compared with the PIN retrieved during step 32 and during step 46 the nonpredictable code remaining after the inputted value has the PIN stripped therefrom is compared with the retrieved nonpredictable code. If matches are obtained during both steps 44 and 46 (step 48) the verification computer signifies verification. If a match is not found during either step 44 or step 46 (step 50) then the user is rejected.

Alternatively to steps 42, 44, 46, 48 and 50, the PIN and nonpredictable code which are retrieved in step 32 may be combined or mixed by the verification computer during step 142 according to the same mixing operation which was carried out by the processor or user device 10 in step 38, e.g. by a simple addition of the two values without carry, with carry, or according to some other more sophisticated algorithm. During alternative step 144 the separate results of the mixing operations carried out by the user device 10 and the verification computer 16 are compared. If a match is obtained, step 148, the user is verified. If a match is not found, step 150, the user is rejected.

A procedure is thus provided wherein user verification may be obtained using the simple and inexpensive procedure disclosed in the parent applications while still providing a high level of security for the user PIN. This security is achieved since the user PIN is never available on an open line which could be tapped except in the form of a word which is a mixture of the PIN with a nonpredictable code and which is virtually impossible to decipher.

Figure 2:
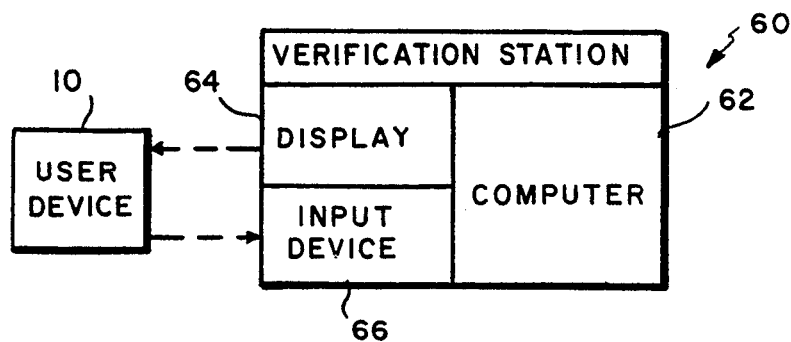
FIG. 2 is a block schematic diagram of a second embodiment of the invention.

FIG. 2 illustrates an alternative configuration in which the teachings of this invention may be utilized. In FIG. 2, The user device 10 is of the same type shown in FIG. 1. However, for this embodiment of the invention, the user device is adapted to be used in proximity to the verification station rather than from a remote location over telephone lines. For this embodiment of the invention, the verification station 60 includes a computer 62, a display 64, such as for example a CRT display, and an input device 66 which may, for example, be a standard computer input keyboard. Referring again to FIG. 3, the operation with this embodiment of the invention starts with step 30, during which the user sends a nonsecret code to the verification computer 62 by, for example, keying this code into input device 66. In response to receiving the nonsecret code, computer 60 retrieves the PIN and generates the nonpredictable code for the user (step 32) and also retrieves a challenge code for the user which is displayed on display 64 (step 70). The user inputs his PIN and the challenge code in an order established for the system to user device 10 using input pads 12 (step 72). During step 74, the processor in device 10 uses the inputted challenge code and the time inputted from its clock to generate a nonpredictable code which, during step 38, is mixed with the inputted pin and the results are displayed on display 14 of device 10. From this point on, the operation for this embodiment of the invention is the same as that previously described with respect to the embodiment of FIG. 1.

Thus, with this embodiment of the invention, as with the prior embodiment of the invention, the pin in uncoded form is never transmitted in a manner such that it could be observed and is not resident in the user's device where it might, using sophisticated technology, be retrieved.

As an alternative to the embodiment shown in FIG. 2, the nonsecret code may be recorded in machine-readable form on device 10 and input device 66 might include a card reader which the card is inserted into to permit the nonsecret code to be read into computer 62.

While the invention has been shown and described above with reference to preferred embodiments, the foregoing and other changes in form and detail may be made therein by one skilled in the art without departing from the spirit and scope of the invention.

What is claimed is:

1. A system for verifying an individual, the system being of the type wherein a user is provided with a nonsecret identification, with a secret PIN and with a user device generating a unique, time-varying, nonpredictable code, the nonpredictable code at a given time being provided to a central verification computer to effect verification, the system characterized by:

the user device having means for inputting the PIN, and means for utilizing the PIN in an algorithm to produce the nonpredictable code for a given time interval; and the central verification computer having means for receiving the nonsecret identification and the nonpredictable code produced at the user device, means for utilizing the nonsecret identification to obtain the time-varying nonpredictable code for the user for the given time interval, and means for utilizing the communicated nonpredictable code and the obtained nonpredictable code to verify the user.

2. A system as claimed in claim 1, including a coded value stored at the user device which value is utilized in addition to the PIN to produce the nonpredictable code.

3. A system as claimed in claim 2 wherein said means for utilizing includes a first means for utilizing a value related to the coded value to produce a nonpredictable value, and a second means for utilizing the PIN to modify at least one of the input to and the output from the first means.

4. A system as claimed in claim 3 wherein the value utilized by the first means is the stored coded value, and wherein said second means includes a means for utilizing the PIN to modify the nonpredictable value output from the first means to produce the nonpredictable code.

5. A method for identifying an individual comprising the steps of:

inputting a PIN for the individual into a device in the possession of the individual;

utilizing the inputted PIN in an algorithm to produce at the device a nonpredictable code for a given time interval; and communicating a nonsecret identifying code for the individual and the nonpredictable code to a central verification computer, the verification computer receiving the communicated nonsecret identification and the nonpredictable code, utilizing the nonsecret identification to obtain the time-varying nonpredictable code for the individual for the given time interval, and utilizing the communicated nonpredictable code and the obtained nonpredictable code to verify the individual.

* * * * *